United States Patent [19]

Asano et al.

[11] Patent Number: 4,931,420
[45] Date of Patent: Jun. 5, 1990

[54] TEMPERATURE HISTORY INDICATOR AND ITS MANUFACTURING METHOD

[75] Inventors: Makoto Asano; Haruki Tsutsumi, both of Yokohama; Eishi Tanaka, Kamakura; Yoshiro Fuseya; Kiyoharu Hasegawa, both of Yokohama; Hiroyuki Akahori, Yokosuka, all of Japan

[73] Assignee: Mitsui Toatsu Chemicals, Inc., Tokyo, Japan

[21] Appl. No.: 43,745

[22] Filed: Apr. 29, 1987

[30] Foreign Application Priority Data

Apr. 30, 1986 [JP] Japan .................. 61-97995
Oct. 29, 1986 [JP] Japan .................. 61-255727

[51] Int. Cl.⁵ ............................................. B41M 5/22
[52] U.S. Cl. .................................. 503/205; 427/150; 427/152; 428/195; 428/203; 428/204; 428/913; 503/208; 503/215; 503/226
[58] Field of Search ............ 503/200, 202, 226, 205, 503/208, 215; 427/150–152; 428/195, 203, 204, 913

[56] References Cited

U.S. PATENT DOCUMENTS

| | | | |
|---|---|---|---|
| 2,712,507 | 7/1955 | Green | 117/36 |
| 3,002,385 | 10/1961 | Wahl et al. | 73/356 |
| 3,695,903 | 5/1970 | Telkes et al. | 99/192 |
| 3,774,450 | 11/1973 | Godsey | 73/358 |
| 3,826,141 | 7/1974 | Pickett et al. | 73/356 |
| 3,954,011 | 5/1976 | Manske | 73/356 |
| 4,057,029 | 11/1977 | Seiter | 116/114 |
| 4,114,926 | 9/1978 | Habib et al. | 282/27.5 |
| 4,284,719 | 8/1981 | Agerhem et al. | 435/18 |
| 4,301,054 | 11/1981 | Buirley et al. | 260/29.4 |
| 4,339,207 | 7/1982 | Hof et al. | 374/160 |
| 4,388,362 | 1/1983 | Iwata et al. | 428/211 |
| 4,397,897 | 4/1983 | Schülke | 428/35 |
| 4,398,753 | 8/1983 | Asano et al. | 282/27.5 |
| 4,400,492 | 8/1983 | Asano et al. | 525/506 |
| 4,469,452 | 9/1984 | Sharpless et al. | 374/160 |
| 4,620,941 | 11/1986 | Yoshikawa et al. | 252/408.1 |
| 4,637,896 | 1/1987 | Shannon | 252/299 |
| 4,643,588 | 2/1987 | Postle et al. | 374/160 |
| 4,704,379 | 11/1987 | Shioi et al. | 503/211 |
| 4,729,671 | 3/1988 | Asano e al. | 374/160 |

FOREIGN PATENT DOCUMENTS

| | | | |
|---|---|---|---|
| 9309 | 2/1965 | Japan | 503/225 |
| 20144 | 6/1967 | Japan | 503/225 |
| 15111 | 9/1972 | Japan | 503/225 |
| 10856 | 4/1974 | Japan | 503/210 |
| 1327 | 7/1977 | Japan | 503/210 |
| 124032 | 1/1980 | Japan | 428/913 |
| 28559 | 4/1982 | Japan | 503/200 |
| 4319 | 9/1982 | Japan | 503/200 |
| 222882 | 3/1983 | Japan | 503/226 |
| 222822 | 11/1983 | Japan | 503/200 |
| 76088 | 3/1984 | Japan | 503/200 |
| 053984 | 7/1985 | Japan | 503/200 |
| 100493 | 4/1986 | Japan | 503/200 |
| 96449 | 6/1987 | Japan | 503/200 |
| WO85/01105 | 3/1985 | PCT Int'l Appl. | 503/202 |
| 1463422 | 6/1977 | United Kingdom | 428/341 |

OTHER PUBLICATIONS

Kogyo Kagaku Zaashi, 65(4), pp. 626–629.
Handbook of Experimental Chemistry, 18, 30 (1958), pp. 28 to 31

Primary Examiner—Bruce H. Hess.
Attorney, Agent, or Firm—Fisher, Christen & Sabol

[57] ABSTRACT

A temperature history indicator and its manufacturing method wherein the indicators are formed as chips, labels, tags or the like and accompanied with those goods or their packings which must be stored at a certain temperature or lower and when their storage temperature rises higher than the certain temperature over a not-permissible time period, this fact can be visibly shown by development or change of color caused by chemical matters in the indicator, characterized in that when temperature rises higher than a certain value, a hydrophobic organic compound enclosed in microcapsules melts and diffuses causing a dye-precursor and a color developer, which are prepared independently of the compound, to be contacted with each other to irreversibly achieve color development or change, that this color development or change system is rendered operative when the temperature rise continues to exceed a permissible time period, and that when the tops of the color development or change systems are coated with a transparent material, the arrangement of a bonding agent is improved neither to break those chemical compositions which cause the color development or change nor to lower their color developing function.

17 Claims, 2 Drawing Sheets

TEMPERATURE HISTORY INDICATOR AND ITS MANUFACTURING METHOD

BACKGROUND OF THE INVENTION

The present invention relates to a temperature history indicator formed as a chip, label, tag and the like and its manufacturing method. More particularly, it relates to temperature history indicators bonded to or accompanied with goods or their packings whose preservation or storage temperatures must be controlled so as to display whether or not the goods have been preserved under their corresponding preservation or storage temperatures, and it also relates to a manufacturing method of the same.

Transportation and preservation of frozen or refrigerated foods, natural flowers, bloods, medicines and the like must be carried out under strictly-controlled temperatures which are not necessarily below the freezing point. Even if the temperatures under which these matters are now preserved are correct, it is left unclear whether or not they have been preserved under their correct temperatures. It has been therefore needed to develop a visual indicator for displaying as easily as possible whether or not each of the matters has been preserved under a predetermined temperature.

As temperature history indicators to meet the need, there can be cited a combination of melting phenomenon of dyed solid resinate and capillarity of absorbent paper, which was proposed by U.S. Pat. No. 3,954,011, and a measure of using that a lipase enzyme is activated in degrees varying with temperature and that its degree of activation can be indicated by different colors with the aid of a Ph indicator, as proposed by Japanese Patent Publication Nos. 57-4319 and 57-28559.

However, these indicators are expensive and cannot be easily used as the temperature history indicator which is applied to each of matters circulated in mass. Inventors of the present invention tried variously to solve this drawback and found an extremely characteristic and effective label (see Japanese Patent Preliminary Publication No. 60-053984) wherein the color developing system of using a methine dye-precursor and an oxidizing material was applied to the temperature history indictor formed as a label. This label indicator comprises a substrate for holding (1) microcapsules enclosing a hydrophobic organic compound which has a melting point, (2) a methine dye-precursor and (3) an oxidizing material.

Continuing to further improve the indicator, the inventors have found that the following problems are still left unsolved when the indicator is practically used.

Firstly, the conventional temperature history indicators are high in manufacturing cost and troublesome in treating them when they are to be used.

Secondly, the manner of storing and controlling matters is different from every matter and some of these matters may be left under a temperature higher than their permissible ones when they are being transported or moved, providing that the time period during which they are left under this temperature is extremely short. It is asked in this case that the color developing system is not worked, but none of the conventional temperature history indicators pays attention to this point and can distinguish the permissible rise of temperature, thereby causing their use to be limited.

Thirdly, when the indicator is stored under high humidity or at a place where dewing, freezing or the like is caused by temperature change or where adherence of oil, other chemicals or compounds is likely to be caused, water, oil or others adhered enter into the indicator to damage its temperature indication function. It was imagined at first that this could be solved by bonding a surface protection layer onto the whole surface of the microcapsule layer. However, it was found in a further study that the hydrophobic organic compound interacted with a surface protection material bonding agent to lower the melting point and that it was also absorbed by the bonding agent to lower the temperature indication function of the indicator, for example.

SUMMARY OF THE INVENTION

According to a temperature history indicator of the present invention, its construction and chemical composition are improved to provide it cheap and to enable it to be easily used. Its color developing or changing system is left inactive even when temperature rises if this temperature rise is within a permissible time period. The top of an ink composition located on the top of the indicator and including microcapsules is covered by a covering layer such as transparent plastic film to eliminate any influence exerted by water or oil parts under some circumstances. Further, when this covering layer covers the top of the ink composition including the microcapsules, there is present no bonding agent on the top of the ink composition to prevent components in the bonding agent from damaging the microcapsules and badly influencing the color developing function of the indicator. Furthermore, the present invention is intended to provide a method of manufacturing this temperature history indicator.

An object of the present invention is therefore to provide a temperature history indicator cheap and easy in treatment.

Another object of the present invention is to provide a temperature history indicator capable of eliminating any influence of water and oil without lowering its temperature display function.

A further object of the present invention is to provide a temperature history indicator capable of distinguishing permissible temperature rise in a time period from not-permissible one.

A still further object of the present invention is to provide a method of manufacturing this improved temperature history indicator reliably.

These and other objects as well as merits of the present invention will become apparent from the following detailed description with reference to the accompanying drawings.

DETAILED DESCRIPTION OF THE PREFERRED EMBODIMENT

Some examples of the temperature history indicator and their manufacturing methods according to the present invention will be described in detail with reference to the accompanying drawings. A temperature history indicator of the present invention will be now described firstly referring to FIGS. 1 through 3 and the construction of layers which will be described this time is deemed as a layer construction example 1.

Figure 1:
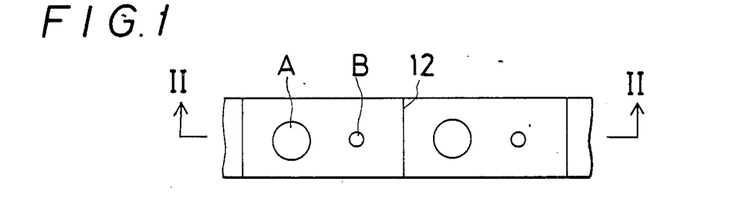
FIG. 1 is a plan view showing an example of the temperature history indicator according to the present invention.
Figure 2:
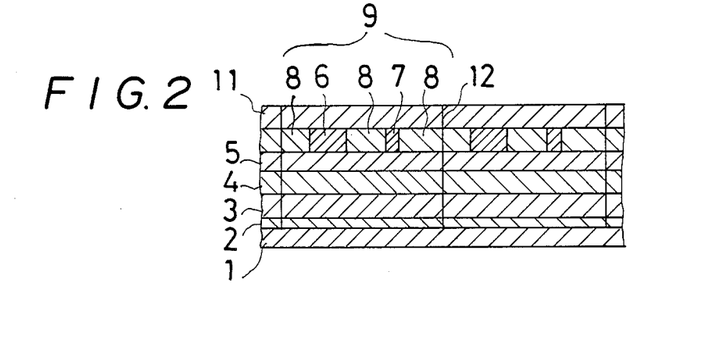
FIG. 2 is a sectional view taken along a line II—II in FIG. 1.
Figure 3:
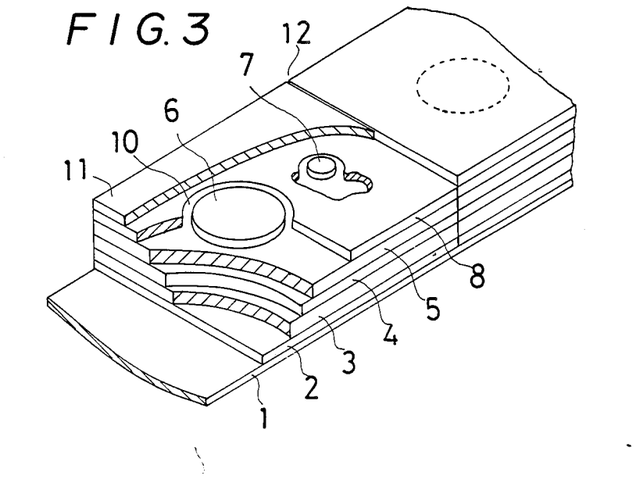
FIG. 3 is a perspective view showing the temperature history indicator partly cut away and enlarged.

As shown in FIGS. 1 through 3, this example of the temperature history indicator is formed as a label or tag, and numeral 3 represents a substrate, on the underside of which is prepared a bonding agent 2 to enable the indicator labels to be bonded to any of goods or their packings when a peeling sheet 1 is torn off. When the indicator labels of the present invention are not bonded directly to either of those goods whose temperature must be controlled or their packings but arranged only in the vicinity of the goods, however, the peeling sheet 1 and the bonding agent 2 are made unnecessary and means for arranging the indicator labels in the vicinity of the goods may be prepared instead.

On the top of the substrate 3 are formed a layer 4 containing a color developer, a barrier layer 5 and ink composition portions 6 containing either of a dye-precursor and microcapsules enclosing a hydrophobic organic compound which melts at a predetermined temperature or microcapsules enclosing a hydrophobic organic compound which melts at a temperature and solves a dye-precursor. Color development or change attained when the label is composed as described above can be visibly viewed at some color developing areas denoted by A in FIG. 1.

The indicator label of the present invention can be judged by eyes under visible light and this judging is based on the color development attained when the dye-precursor is contacted with the color developer. The term "color development" means that tone of color changes from colorless to colored, but the color changes its density, and that tone of color changes from a color to other colors.

A color developing system denoted by 7 is provided at a checking area shown by B.

The checking area B enables people to easily see that the temperature control function of the indicator label is normally operating. The checking area B is also a color developing portion containing microcapsules which are not sensitive to temperature and it is located not at the color developing area A but preferably in the vicinity thereof.

The color developing system 7 at the checking area B is different from that at the color developing area A and it is formed, for example, in such a way that microcapsules enclosing a hydrophobic organic compound and a solved dye-precursor or color developer are pattern-printed along with an ink composition containing a color developer or dye-precursor. In the case of the temperature history indicator label of the present invention, the microcapsules in the ink composition 6 must be broken before the indicator label is to be used, and if this microcapsule breaking process is carried out simultaneously with a process of breaking the microcapsules in the color developing system 7 at the checking area B, it can be easily checked whether or not the process of breaking the microcapsules in the ink composition 6 has been finished, because the color developing system 7, different from that at the color developing area A, undergoes its color development regardless of temperature.

It is not an essential matter of the present invention that wrong use of the indicator label can be prevented by this checking area B (or color developing system 7) but any of indicator labels having no checking means like this can be included in the present invention.

Numeral 11 represents a covering layer made of transparent plastic film, for example, and this covering member is bonded to the top of the indicator label by means of a bonding agent 8. The bonding agent 8 is present on the top of the indicator label but not on the ink composition portions 6, and when the bonding agent 8 is applied according to the printing manner, it is preferable to provide a clearance 10 around each of the ink composition positions 6.

Numeral 9 denotes a portion formed directly on the layer 4 or with the barrier 5 interposed between them and containing microcapsules. More specifically, the portion 9 contains at least the ink compositions 6, color developing systems 7 and bonding agent 8 on a same plane.

In order to show the color developing and checking areas A and B, it is preferable that ring-shaped marks, for example, are printed on the substrate 3 or covering layer 11, or that dyes for enabling the presence of these areas to be visibly viewed are contained in the ink composition portion 6 or color developing system 7.

The temperature history indicators of the present invention are preferably made like a long tape and when they are to be used, a piece of label or tag is cut off from the tape along a cut-off line 12. Instead of forming them like this long tape, it may be provided as cut-off pieces or a sheet on which a plurality of labels are formed. These are variations made depending upon manufacturing processes and included in the present invention.

The temperature history indicator of the present invention as described above can have the following lamination arrangements:

Layer Construction Example 2

The layer 4 in the above-described lamination example 1 is replaced by a layer containing a dye-precursor and the ink composition in the layer 9 is replaced by an ink composition which contains microcapsules enclosing a color developer and a component which melts at a predetermined temperature, or an ink composition which contains microcapsules enclosing a component which melts at a predetermined temperature and solves a color developer. The others in the lamination example 1 are left unchanged.

Layer Construction Example 3

Figure 4:
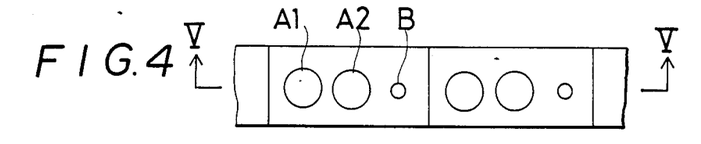
FIG. 4 is a plan view showing another example of the temperature history indicator according to the present invention.

As shown in FIG. 4, two color developing areas A1, A2 and a checking area B are provided. Needless to say, those having color developing areas more than 2 are also included in this example. When hydrophobic organic compounds each having a predetermined melting point are used for the color developing systems at the color developing areas A1 and A2, 2 or more temperatures can be controlled.

Figure 5:
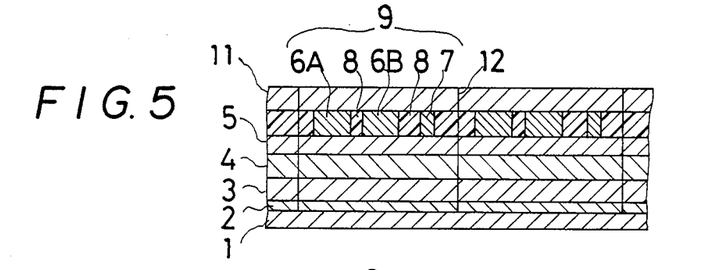
FIG. 5 is a sectional view taken along a line V—V in FIG. 4.

As shown in FIGS. 4 and 5, the layer 4 containing a color developer and the barrier layer 5, similar to those in the lamination example 1, are formed on the substrate 3, and in the layer 9 on the layer 5 are formed ink composition portions 6A and 6B comprising an ink composition which contains microcapsules enclosing a dye-precursor and a component which melts at a predetermined temperature, or an ink composition which contains microcapsules enclosing a component which melts at a predetermined temperature and solves a dye-precursor.

Further, the color developing and checking system 7 is formed in the microcapsules-containing layer 9 and the coating 11 is bonded to the tops of the layer 9 and color developing system 7, similarly to the case of the lamination example 1.

Layer Construction Example 4

The layer 4 in the above-described lamination example 3 is replaced by a layer containing a dye-precursor and the ink composition in the microcapsules-containing portion 9 is replaced by an ink composition which contains microcapsules enclosing a color developer and a component which melts at a predetermined temperature, or an ink composition which contains microcapsules enclosing a component which melts at a predetermined temperature and solves a color developer. The others are made similar to those in the lamination example 3.

Layer Construction Example 5

Figure 6:
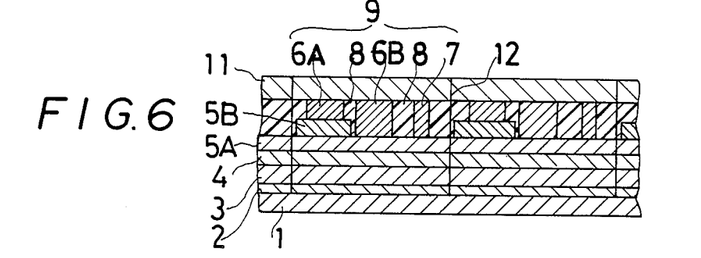
FIGS. 6 and 7 are sectional views showing other examples of the temperature history indicator according to the present invention.

As shown in FIG. 6, a barrier 5B is partly laminated on a barrier 5A, which is similar to the one in the layer construction example 3 or 4, according to the stripe coating process or the like. Those macromolecule materials which are used for the barriers 5A and 5B may be same or different from each other. The barriers 5A and 5B may be laminated as two or more layers.

The ink composition portion 6B is formed on the barrier 5A while the ink composition portion 6A on the barrier 5B. The color developing and checking system 7 may be formed on either of the barrier layer 5A or 5B, and the others are made similar to those in the lamination example 3 or 4.

Lamination Example 6

Figure 7:
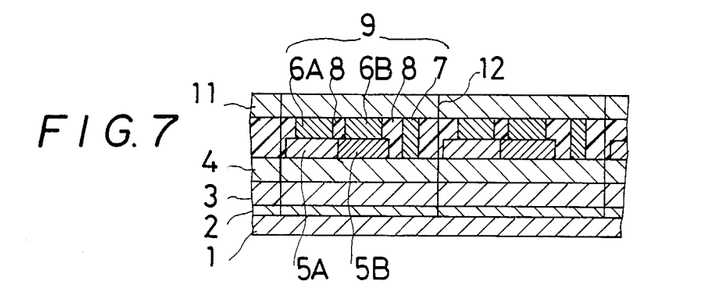

As shown in FIG. 7, the barrier layers 5A and 5B are arranged side by side partly on the layer 4 in the lamination example 3 or 4 according to the stripe coating process. Those macromolecule materials which are used for the barrier (or macromolecule) layers may be same or different from each other. In addition, they may be same or different in thickness. Further, they may be laminated as two or more layers. Furthermore, an additional macromolecule layer may be provided under them.

The ink composition portion 6A is formed on the barrier 5A while the ink composition portion 6B on the barrier 5B. The color developing and checking system 7 may be formed on either of the barrier layer 5A or 5B. The others are made similar to those in the lamination example 3 or 4.

Although some preferable lamination examples of the present invention have been described, it should be understood that the present invention is not limited to these lamination examples. The ink composition portions 6A and 6B in the above-described lamination examples 3 through 6 may develop different colors. Or they may develop a color in different shapes. Further, an appropriate barrier agent may be contained in the microcapsules-containing layer without forming the barrier (or macromolecule) layers in the lamination examples.

As shown in FIG. 3, the bonding agent 8 is transferred or coated to the whole area of the microcapsules-containing portion 9 where the ink composition portion(s) 6 (6A, 6B) is(are) not present, and as the result, the bonding agent 8 cannot be found on the top and underside of the ink composition portion 6 (or 6A and 6B). When arranged like this, it can be prevented that the color developing system is wrongly influenced by components contained in the bonding agent and that water, oil and the like enter into the ink composition portion 6 (or 6A and 6B) through the sides of the label piece. However, it is not necessarily essential to transfer or coat the bonding agent 8 to the whole area of the microcapsules-containing portion 9 where the ink composition portion 6 (or 6A and 6B) is not present. When the bonding agent is made present only in the vicinity of and around the ink composition portion 6 (or 6A and 6B) or at the circumferential rim of the label piece, for example, water, oil and the like can be prevented from entering into the ink composition portion 6 (or 6A and 6B) through the sides of the indicator label.

If the amount of the bonding agent contacted with the ink composition portion 6 (or 6A and 6B) is small, the bonding agent 8 may contact the top of the ink composition portion 6 (or 6A and 6B). When the bonding agent 8 is transferred, like broken or fine lines, to the indicator label according to the transfer manner, the total amount of the bonding agent 8 contacted with the top of the ink composition portion 6 (or 6A and 6B) can be kept extremely small, thereby preventing the color developing system from being wrongly influenced.

Even if a part of the bonding agent 8 is forced onto the top of the ink composition portion 6 (or 6A and 6B) but when the amount of this forced part of the bonding agent is small, the color developing system can be left not influenced because of the same reason as described above.

The manner of forming the above-described layers (or layer 4, barrier 5 and microcapsules-containing portion 9, for example) has no limitation particularly, but when a layer is to be formed on the whole top of its lower layer, it is preferable to employ the coating manner, which usually includes the air knife coating, reverse-roll coating, gravure coating and the like.

When a layer is to be formed on a part of its lower layer, there can be employed various kinds of the partial coating and printing manners including the stripe coating such as the gravure coating and reverse-roll coating, and the printing such as the flexography, gravure printing and screen printing. However, it should be understood that the present invention is not limited to the above-mentioned manners.

The layer 4 has a thickness of preferably 1–20 $\mu$m, more preferably 2–20 $\mu$m; the barrier 5 has a thickness of preferably 0.5–10 $\mu$m, more preferably 1–5 $\mu$m; and each of the ink composition portion 6 and checking area 7 has a thickness of preferably 3–50 $\mu$m, more preferably 5–10 $\mu$m.

The hydrophobic organic compounds each having a predetermined melting point are microcapsulated according to the chemical or physicochemical manner and they are gained as a aqueous suspension of the O/W emulsion type. Printing of the microcapsules-containing layer is carried out using a water base printing ink made of the microcapsules and other additional matters or an oil base printing ink in which the microcapsules are dry powder made according to the spray drying process and then mixed with other matters. Particularly, it is the most preferable that the screen printing process is used to print the microcapsules, and a water base microcapsule ink is often used in this case.

The ink composition portion 8 of bonding agent and protection layer 11 of plastic film can be formed according to various manners and they are formed according to the following manners, for example, in the present invention:

(1) A pressure sensitive bonding agent is used. A layer of the pressure sensitive bonding agent is formed, 2–30 μm thick (when dried), according to the partial printing or coating process on the top of the layers which have been formed until then as the indicator label but except those portions on the top thereof where the color developing and checking areas are present, and a transparent plastic film is then laminated thereon.

(2) A resin of the ultraviolet setting type is used. The ultraviolet setting resin is formed, 2–30 μm thick, according to the partial printing or coating process on the top of the layers which have been formed until then as the indicator label, and a transparent plastic film is bonded thereon, and then exposed and polymerization-bonded by the ultraviolet radiation.

(3) A bonding agent of the hot melting type is used. A layer of the hot melting type bonding agent is formed 2–30 μm thick according to the partial printing or coating process and a transparent plastic film is laminated on the hot-melted bonding agent layer.

The processes following the above-mentioned pattern printing are successively carried out using a printing machine provided with a laminator.

The indicator labels thus obtained are die-cut, punched or slit according to various manners to form temperature history indicator labels or a roll of labels in which the indicator labels are temporarily attached to a roll of peeling paper. In the Figures numeral 12 represents a cut-off line.

The indicator labels of the present invention are bonded directly to those goods whose temperature must be controlled, and when the microcapsules enclosing a hydrophobic organic compound which melts at a predetermined temperature are broken prior to bonding the indicator labels to the goods their storage temperature control function can be operated. This breaking of the microcapsules will be hereinafter referred to as label activation.

The method of breaking the microcapsules comprises passing the indicator labels through pressure rolls, using impact energy or the like. The labelling device of the installed, portable or hand-treated type having a microcapsule breaking mechanism incorporated therein is used to enable the indicator labels to be easily and automatically bonded to intended goods at high speed.

The dye-precursor, color developer and barrier layers are usually formed on one face of the substrate in the present invention, but it may be arranged that the barrier layer is formed partially or wholly on one face of the substrate and that the layer containing the microcapsules enclosing a hydrophobic organic compound which melts at a predetermined temperature and solves a color developer or dye-precursor is formed on one face of the substrate while the dye-precursor or color developer containing layer is formed on the other face thereof.

Various kinds of film-like webs, more concretely, paper, impregnated paper, synthetic paper (paper-like film based on various kinds of synthetic resins), and various kinds of plastic films can be used as the substrate in the storage temperature history indicator label of the present invention. The substrate is usually light-reflective and cloudy (or close to cloudy), but a light-permeable and transparent (or semi-transparent except cloudy) substrate may be used. The temperature history indicator is often used to chilled or frozen foods which are left under humid circumstances. It is therefore preferable that the substrate is one of the waterproof synthetic papers, various plastic films and resin-impregnated papers. The substrate usually has a thickness of 30–200 μm but it is not limited to this range of thickness.

The hydrophobic organic compounds each used for the label of the present invention and having a predetermined melting point are selected from the group of those hydrophobic organic compounds or eutectic mixtures of two or more fixed hydrophobic organic compounds wherein they can change from solid to liquid and vice versa responsive to the environmental temperature in the microcapsules and wherein when they are forced out of the microcapsules and the temperature is lower than a predetermined value, they are left solid or semi-solid but when the temperature is higher than the predetermined value, they behave like solution. The term "predetermined melting point" means a specific temperature optionally selected from the upper range of temperatures under which an intended matter must be stored.

The hydrophobic organic compounds each having a sharp melting point in the range of $-30°$ C. to $70°$ C. and also having a boiling point higher than $200°$ C. can be used by the present invention and when they are cited in the order of their being lower in melting point, they are tricaproylglyceride, nonylbenzene, diethyl pimelate, n-butyl benzoate, n-decyl cyclopentane, 1-pentyl naphtalene, octyl enantate, heptyl caprate,1-n-butyl naphtalene, diethyl azelate, methyl caproate, 1-hexyl naphtalene, dodecyl acetate, linoleic alcohol, octyl caprylate, decyl acetate, ethyl undecanate, decyl benzene, 1,6-dimethyl naphtalene, 1-ethyl naphtalene, 1-linoleo-2,3-dicapric-glyceride, undecyl acetate, 1-lauro-2,3-dilinoleic glyceride, 1-caproyl-2,3-distearic triglyceride, undecyl caproate, n-nonyl cyclohexane, 1-propyl naphtalene, n-undecyl cyclopentane, 1-myrist-2,3-dilinoleic triglyceride, 1-heptyl naphtalene, 2-ethyl naphtalene, 1-capryl-2,3-dioleic triglyceride, diethylsuberate, undecyl benzene, n-dodecyl cyclopentane, ethyltridecanate, butyl laurate, dodecyl caproate, methylricinolate, 2-n-pentyl naphtalene, 1,3-dimethyl naphtalene, dimethyl azelate, dimethyl suberate, 2-n-hexyl naphtalene, heptyl laurate, 1-n-octyl naphtalene, ethyl laurate, n-decyl cyclohexane, diethyl sebacate, 1-linoleo-2,3-dicapric-triglyceride, butyl myristate, 2-n-heptyl naphtalene, tetradecyl caproate, n-dodecyl benzene, 1-oleo-2,3-decapric-triglyceride, 2-oleo-2,3-dicapric-triglyceride, methyl laurate, n-tridecyl cyclopentane, n-undecyl cyclohexane, tridecyl caproate, nonyl naphtalene, n-tetradecyl cyclopentane, n-pentadecane, tridecyl benzene, 1-heptadecene, 2-n-octylnaphtalene, 2-n-nonyl naphtalene, 2-undecanone, ethyl myristate, n-dodecyl cyclohexane, 1-myrist-2,3-dioleictriglyceride, isobutyl palmitate, ethyl pentadecanate, decyl naphtalene, n-tetradecyl benzene, pentadecyl caproate, n-pentadecyl cyclopentane, 1-octadecene, hexadecane, 1-palmit-2,3-dioleic-triglyceride, butyl palmitate, methyl myristate, methyl pentadecanate, amyl palmitate, methyl oleate, 2-n-decylnaphtalene, propyl palmitate, n-hexadecylcyclopentane, octadecane, apyol, benzylidene diethyl malonate, nonadecane, benzyl cinnamate, diethyl terephtalate, 1-tetradecanol, 1,2-diphenyletane, 1,3,5-trimethoxy benzene, p-dimethoxy benzene, octadecanol, 9-ethyl anthracene and p-methyl benzophenone.

Combinations of two or more hydrophobic compounds include preferably those of compounds of a same group, more specifically, those of carboxylic acid ester group such as ethyl myristate and methyl myristate, and butyl palmitate and amyl palmitate; those of aromatic group such as nonyl naphthalane and pentyl naphthalane, and undecyl benzene and tridecyl benzene; and those of paraffine group such as pentadecane and octadecane, and pentadecyl cyclopentane and hexadecyl cyclopentane. It should be understood, however, that the present invention is not limited to the combinations of these compounds, and any of those both compounds which melt each other can be combined.

Combinations of a dye-precursor and a color developer include (i) those of dye-precursors (or color former precursors) having a lactone ring and acidic color developers (or compounds containing phenolic hydroxyl, phenolic plastics, salts of organic carboxylic acid and inorganic solid acids) and (ii) those of methine dye-precursors and oxidizing color developers (or preferably benzoquinone derivatives substituted by electron-attracted radicals). It should be understood, however, that the present invention is not limited to these combinations.

The dye-precursors used by the present invention and having lactone rings include groups of colorless or light-colored compounds such as diarylphthalides, fluoranes and azaphthalides. More specifically, they are the so-called leuco dyes which develop colors of red, orange, blue, green, black and so on when contacted with one of the acidic color developers, and they include crystal violet lactone, malachite green lactone, 2,2-bis(1'-ethyl-2'-methylindol-3'-yl) phthalide(indolyl red), 2,2-bis(1'-octyl-2'-methyl indol-3'-yl)phthalide, 3-diethylamino-6-methyl-7-chloro-fluoran, 3-diethylamino-5,7-dimethylfluoran, 3-diethylamino-7,8-benzofluoran, 3-diethylamino-7-methoxyfluoran, 3-diethylamino-6-benzyloxyfluoran, 3-diethylamino-7-chlorofluoran, 3-diethylamino-7-(o-chloranilino)fluoran, 3-dibutyl amino-7-(o-chlor amino)fluoran, 3-diethylamino-6-dibenzyl amino fluoran, 3-diethylamino-6-dibenzylaminofluoran 3-diethylamino-6-methyl-7-phenylaminofluoran, 3-diethylamino-6-methyl-7-xylylaminofluoran, 3-dibutylamino-6-methyl-7-phenylaminofluoran, etc.

As the acidic color developers, there are used organic or inorganic acids which can form colored coloring matters when molecule-contacted with the above-mentioned dye-precursors having lactone rings. More specifically, they include polymetallic salts of carboxylic acids of the aromatic group (3,5-di-α-methylbenzylsalicylic acid Zn salt, 3,5-di-tert butylsalicylic acid Zn salt and 3-α,α-dimethylbenzyl 5-phenylsalicylic acid Zn salt, for example) disclosed by Japanese Publication No. 57-1327, polymetallized matters of salicylic acid-p-substituted phenol-formaldehyde condensation products (Zn denatured matters of salicylic acid-p-octylphenol-formaldehyde condensation products and Zn denatured matters of salicylic acid-p-nonylphenol formaldehyde condensation products, for example) disclosed by Japanese Preliminary Publication Nos. 54-40898 and 61-31286, polymetallized matters of salicylic acid co-condensation resins made by co-condensating mesitylene, p-substituted phenol or the like using salicylic acid and α,α-dialkoxy-p-xylene as essential components, as disclosed by Japanese Patent Application Nos. 61-6482, -20250 and -305332 which were filed by the same applicant as the present invention, Zn denatured matters of p-alkyl phenolformaldehyde condensation products proposed by Japanese Preliminary Publication Nos. Sho 48-25744 and 54-158495, polymetallized matters of p-substituted phenol and phenolformaldehyde co-condensation resins proposed by Japanese Publication Nos. 61-4358, -4359, -4673 and -4674, polymetallic salts of bisphenolsulfone proposed by Japanese Preliminary Publication No. Sho 55-113591, inorganic semi-synthetic solid acids proposed by Japanese Preliminary Publication No. 58-217389, and p-substituted phenolformaldehyde condensation products proposed by Japanese Publication No. 42-20144. Needless to say, the acidic color developers used by the present invention are not limited to the above-mentioned ones and all of those materials which can develop colors when contacted with one of the dye-precursors having lactone rings can be employed.

The methine dye-precursor is a general term representing colorless or light-colored compounds having the following general formula (I):

wherein X, Y and Z are unsubstituted or substituted phenyl groups, unsubstituted or substituted naphthyl groups, unsubstituted or substituted β-styryl groups, or unsubstituted or substituted aromatic heterocyclic ring radicals, the X, Y and may be same or different, and two of the X, Y and Z may be combined to form a ring, and wherein when the number of the aromatic heterocyclic ring radicals is one or less of the X, Y and Z, at least one amino group, substituted amino group or lower alkoxy group is located at the para-position to a methylene group in the center of a molecule in the case of the phenyl groups, naphthyl groups or β-styryl groups. The colorless or light-colored compounds include (1) triaminotriphenylmethane dyes such as 4,4',4''-tris-dimethylamino-triphenylmethane, 4,4',4''-tris-diethylamino-triphenylmethane, and 4,4'-bis-methylamino-4''-dimethylaminotriphenyl methane, (2) diamino-triphenylmethane dyes such as 4,4'-bis-dimethylamino-triphenyl methane, 4,4'-bis-dimethylamino-4''-methyl-triphenyl methane, 4,4'-bis(N-benzyl-N-ethylamino)triphenyl methane, and 4,4'-bis(dimethylamino)-4''-methoxy triphenylmethane, (3) monoaminotriphenylmethan coloring matters such as 4,4'-dimethoxy-4''-dimethylamino-triphenylmethane and 4,4'-dimethoxy-3'-methyl-4''-methylamino-triphenylmethane, (4) naphthyl methane dyes such as bis(4-dimethyl-aminonaphthyl-1)-4'-dimethylaminophenylmethane, (5) β-styrylmethane dyes such as bis(4-dimethylaminophenyl)-β-styrylmethane and bis(4-dimethylaminophenyl)-β-(4'-dimethylaminostyryl) methane, and (6) indolylmethane dyes such as bis(1-ethyl-2-methylindol-3-yl)-(4'-ethoxyphenyl)methane and bis(1-ethyl-2-methylindol-3-yl)-(4'-dimethylamino phenyl) methane. There can be further used methylene dyes (see Japanese Preliminary Publication No. sho 58-74389) and 3-diethylamino-6-chloro-7-methyl-9-(2'-methylphenyl carboxamido)phenylxanthen, 3-dibutylamino-7-(2''-chlorophenyl)amino-9-(2'-methylphenylcarboxamido) phenylxanthen, 3-diethylamino-6-methyl-7-anilino-9-(2'''-ethylphenylcarb oxamido)-phenylxanthen, etc., which are cited in Japanese Preliminary Publication No. 60-58043.

As the oxidizing color developer, there can be used those which can oxidize the methine dye-precursors to form colored coloring matters, and they can be fixed benzoquinone derivatives which are substituted by electron attractive radicals and represented by the following general formula:

Wherein $R_1$ to $R_6$ are selected from a halogen atom, cyano group, nitro group, carboxyl group, alkoxycarbonyl group, aryloxycarbonyl group, aralkyloxycarbonyl group, alkylsulfonyl group, arylsulfonyl group, aralkylsulfonyl group, alkoxysulfonyl group, aryloxysulfonyl group, aralkyloxysulfonyl group and acyl group, $R_7$ and $R_8$ are hydrogen atoms, alkyl groups, aryl groups, aralkyl groups, alkoxy groups, aralkyloxy groups, alkylthio groups or arylthio groups, and two adjacent carboxyl groups may form an imido ring.) Particularly preferable examples of them are fixed p-benzoquinone derivatives whose two or more radicals are substituted by electron attractive radicals.

More specifically, the benzoquinone derivatives which are used by the present invention are 2,3-dicyano-5,6-dichloro-1,4-benzoquinone, 2,3-dibromo-5,6-dicyano-1,4-benzoquinone, 2,3,5,6-tetrabromo-1,4-benzoquinone, 2,3,5,6-trtraiodo-1,4-benzoquinone, 2,3,5,6-tetraethoxycarbonyl-1,4-benzoquinone, 2,3,5,6-tetra-iso-butoxycarbonyl-1,4-benzoquinone, 2,3,5,6-tetrapropyloxycarbonyl-1,4-benzoquinone, 2,5-diethoxycarbonyl-1,4-benzoquinone 2,5-di-n-hexyloxycarbonyl-1,4-benzoquinone, 2,5-dicyclohexyloxycarbonyl-1,4-benzoquinone, 2,5-dibenzoyl-1,4-benzoquinone, 2,5-di-n-butoxycarbonyl-3,6-dichloro-1,4-benzoquinone, 2,5-diethoxycarbonyl-3,6-dibromo-1,4-benzoquinone, 2,5-di-n-octoxycarbonyl-3,6-dibromo-1,4-benzoquinone, 2,5-dibenzyloxycarbonyl-3,6-dichloro-1,4-benzoquinone, 2,5-dibenzoyl-3,6-dichloro-1,4-benzoquinone, 2,5-diacetyl-3,6-dibromo-1,4-bezoquinone, 2,5-diethoxycarbonyl-3,6-diphenyl-sulfonyl-1,4-benzoquinone, 2,5-di-iso-butoxycarbonyl-3,6-di-4'-tolylsulfonyl-1,4-benzoquinone, 2,5-dicyclohexyloxycarbonyl-3,6-di-4'-tolylsulfonyl-1,4-benzoquinone, 2,5-di-n-octyloxycarbonyl-3,6-di-4'-cyclohexylphenylsulfonyl-1,4-benzoquinone, 2,5-di-n-hexyloxycarbonyl-3,6-di(3',4'-dimethylphenylsulfonyl)-1,4-benzoquinone, 3,4,5,6-tetraethylsulfonyl-1,4-benzoquinone, 2,3,5,6-tetra-n-octylsulfonyl-1,4-benzoquinone, 2,5-dicyclohexyloxycarbonyl-3-benzylsulfonyl-1,4-benzoquinone, 2,5-di-n-butoxycarbonyl-3-($\beta$-tolyl)sulfonyl-1,4-benzoquinone, 2,5-diethoxycarbonyl-3-(2',5'-dimethylphenylsulfonyl)-1,4-benzoquinone, 2,5-di-n-butoxycarbonyl-3,6-di-n-butoxycarbonyl-1,4-benzoquinone, 2,5-di(4'-tolylsulfonyl)-3,6-dibromo-1,4-benzoquinone, 2-benzoyl-1,4-benzoquinone, 2-phenylsulfonyl-1,4-benzoquinone, 2-(4'-methylphenylsulfonyl)-1,4-benzoquinone, 2-(4'-diphenylsulfonyl)-1,4-benzoquinone, 2-benzyl sulfonyl-1,4-benzoquinone and the like. It should be understood, however, that the present invention is not limited to the above compounds.

These dye-precursors and color developers are used in the label of the present invention as (1) a micro-particles containing suspension which is prepared by intimately blending or wet milling them with a dispersing agent or a solution of a high polymer capable of acting as a protective colloid in a solvent which does not dissolve them and preferably in water, or (2) microcapsules containing a hydrophobic organic compound in which either of a color developer or dye-precursor is dissolved.

In the case of those of the dye-precursors which are air-oxidized to gradually develop colors when stored or exposed to light, one or more are selected from (1) water-soluble alkanolamines, (2) water-soluble sequestering agents, and (3) quaternary ammonium salts and added in an appropriate amount to the suspension or microcapsules-containing coating or printing ink composition so as to stable the dye-precursors under storage.

(1) Useful alkanolamines having a tertiary amino group include tris-N-(2-hydroxyethyl)amine, tris-N-(2-hydroxypropyl)amine, tris-N-(3-hydroxypropyl)amine, N,N-dipropyl-N-(2-hydroxyethyl)amine and the like.

(2) Useful sequestering agents include ethylenediamine-tetraacetic acid, N-hydroxyethyl-ethylenediamine-N,N'N'-triacetic acid, diethylenetriamine-pentaacetic acid, N-hydroxyethyl-iminodiacetic acid, ethylenediamine-N,N'-diacetic acid, 1,3-diaminopropan-2-ol tetraacetic acid and nitrilotriacetic acid, alkali metal salts thereof, and the like.

(3) Useful quaternary ammonium salts include lauryltrimethylammonium chloride, stearyltrimethylammonium chloride, distearyldimethylammonium chloride, trimethylbenzylammonium chloride and the like.

Where an alkanolamine, a sequestering agent and/or a quaternary ammonium salt are used, they are added in a total amount of 1 to 10,000 parts by weight, preferably 1 to 1,000 parts by weight, per 100 parts by weight of the methine dye.

The hydrophobic organic compound or the one in which the color developer or dye-precursor is solved is microencapsulated according to any of various well-known microcapsulation processes including, for example, (1) coacervation process using gelatin as the shell material, (2) interfacial polycondensation process, (3) in-situ polymerization process and the like.

Of these microcapsules thus prepared, the one prepared according to the (A) in-situ polymerization process using aminoaldehyde resin as its capsule wall material (or prepared according to the process disclosed by Japanese Preliminary Publication No. 61-11141, for example) or the other prepared according to the (B) in-situ polymerization process using the radical polymer of polymeric monomer as its wall film (or prepared according to the process disclosed by Japanese Preliminary Publication No. 61-40189, for example) is preferable in (a) that its wall film is dense and low in permeability, (b) that its microencapsulation is high, (c) that it is not corroded and the like.

The barrier used for the indicator label of the present invention and made of macromolecule material is intended to control the permeation of the hydrophobic organic compound in the microcapsules and also control the lapse of time during which the color developer and dye-precursor molecule-contact each other and thus start its color development.

Material examples of which the barrier is made include natural, semi-synthetic or synthetic macromolecules such as polyvinylalcohol, polyacrylamido, carboxymethylcellulose, methylcellulose, hydroxyethylcellulose, gelatin, casein and starch derivative; synthetic rubber latexes and denatured latex matters such as styrene butadiene rubber latex, methylmethacrylate butadiene rubber latex and chloroprene rubber latex; synthetic resin dispersed solutions made by emulsifying and polymerizing one of various unsaturated monomers or two or more thereof (or emulsions such as acrylonitrile-butylacrylate-2-ethylhexylacrylate copolymer, acrylonitrile-butylacrylateethylacrylate copolymer, acrylonitrilebutylacrylate copolymer, methylmethacrylate-2-ethylhexylacrylate copolymer, styrene-ethylacrylate copolymer, styrene-butyl-acrylate copolymer, styrenemethylmethacrylate-ethylacrylate copolymer, styrene-divinylbenzene-ethylacrylate copolymer, styrene-butadiene copolymer, styrenemethylmethacrylate-butadiene copolymer, methylmethacrylate-butadiene copolymer, vinylacetate-ethylene copolymer, acrylonitrilebutylacrylate-hydroxyethylmethacrylate-acrylamido copolymer, vinylidene chloride-acrylic acid ethyl copolymer, acrylic acid ester-vinylacetate copolymer, acrylic acid ester-ethylene copolymer, acrylic acid ester-N-methylolacrylamido copolymer, and acrylic acid easter-vinylether copolymer); and acryl resin, polyamido resin, epoxy resin and the like of the solution type.

Various acrylic emulsions prepared according to the emulsifying and polymerizing process are the most preferable because (A) the permeability of the hydrophobic organic compound can be freely controlled by changing the rate of the monomers used, that is, the rate of (meta-) acrylic ester, acrylonitrile and styrene used, for example, (B) liquids suitable for use as the coating can be easily prepared and uniform and dense macromolecule films can be provided according to the usual coating process such as (air knife coating, bar coating and blade coating), and (C) their waterproof is excellent.

As the barrier layer made of these acrylic emulsions, there can be cited those disclosed by Japanese Patent Application Nos. 61-113547, 60-227041, 60-269432 and 61-5023, which are prepared by coating, drying and filming various kinds of the acrylic emulsions.

Various kinds of inorganic or organic pigments or water-soluble binders may be contained in the layer containing the color developer or dye-precursor and in the printed portion of the checking color developing system 7. The inorganic or organic pigments include kaolin, talc, calcium carbonate, titanium oxide, zinc oxide, white carbon, silica, aluminum hydroxide, urea-formaldehyde resin filler and polystyrene dispersion, for example. The water-soluble binders include polyvinyl alcohol, ethyl cellulose, carbonyl methyl cellulose, soluble starch, casein and natural gum, for example.

Stilt materials such as wheat starch, potato starch, cellulose starch and various synthetic resin particles may be used to prevent the microcapsules from being broken when subjected to minute pressure.

A transparent plastic film layer is provided in the label of the present invention to protect the label from water and the like. This protective layer is preferably colorless and transparent, but it may be colored and transparent or colored and semi-transparent. The film used includes PET (polyester), PP (polypropylene), PE (polyethylene) and PC (polycarbonate) and it is a oriented film having a thickness of 5–30 μm.

Examples of the temperature history indicator label and its manufacturing method will be described.

EXAMPLE 1

An indicator label shown in FIGS. 1 through 3 was prepared according to the following method.

A synthetic paper 3 (YUPO SGG-80 made by OHJI PETEROCHEMICAL COMPANY LTD.), which used polypropylene as its base film, was used as the substrate 3. A layer 4 was formed on the substrate 3 by coating an aqueous composition (35% dispersion), which had the following composition, through the Mayer bar coater and drying it to have an amount of 6 g/m² when the coating was dried.

|  | solid weight part |
| --- | --- |
| calcinated kaolin | 70 |
| calcium carbonate | 30 |
| dispersant (polyacrylic acid Na salt) | 0.5 |
| starch binder (water solution) | 8 |
| synthetic rubber latex (dispersion) | 8 |
| color developer* (dispersion) | 3 |

*color developer: 2,5-dicyclohexylcarbonyl-3-benzylsulfonyl-1,4-benzoquinone

An acryl emulsion (solid content of 45% and prepared by the emulsion-polymerization method) comprising those monomers of acrylonitrile(30 mol %)-butylacrylate(68 mol %)-acrylic acid(2 mol %) was then diluted by water to have a solid content of 20%, coated, dried and filmed on a surface on the layer 4, on which the color developer is present, by the Mayer bar coater to have an amount of 2.8 g/m² when the coating is dried, thereby forming a barrier 5 of acrylic polymer.

An acrylic bonding agent 2 of the emulsion type was coated and dried on a silicon treated peeling paper 1 to have a thickness of 18 μm when the coating was dried. The bonding surface of this peeling paper was bonded to (or laminated on) the underside of the above-prepared sheet for a printing lamination.

An aqueous ink having the following composition was then prepared.

|  | solid weight part |
| --- | --- |
| microcapsules of myristic acid methylester in which a dye-precursor* was dissolved | 100 |
| MSBR latex | 15 |
| alginic acid Na salt | 2 |
| polyacrylic acid Na salt | 2 |

*microcapsule slurry prepared by encapsulating methylmyristate, in which 2% of 3-di-ethylamino-6-chloro-7-methyl-9-(2'-methyl-phenylcarboxyamido)phenylxantane was dissolved as the dye-precursor, with melamine-formaldehyde resin according to the in-situ polymerization.

The aqueous ink was pattern-printed on the barrier layer 5 according to the screen printing manner to form ink composition positions 6 (the dried amount of this printing matter was 10 g/m²).

Aqueous screen printing ink (viscosity: 3000 CPS) having a solid content of 40% was formed using as its main components a slurry of microcapsules composed of melamine resin film which was made by in-situ polymerization with phenylxylylethane, dissolving 3 weight percent of 4,4'-bis-(dimethyl-amino)-3''-methy-4''-ethoxytriphenylmethane, 2,5-di-n-butyloxycarbonyl-3-benzylsulfonyl-1,4-benzoquinone (which was suspended in water by wet-pulverizing under an anionic high molecular surface active agent), polyacrylic acid thickener and aqueous dispersion bonding agent.

The aqueous ink was pattern-printed on the printing sheet except the ink composition portions according to the screen printing manner to form color developing systems 7.

A screen printing bonding agent ink composition (45% of solid content and 1500 cps) which used previously-prepared acryl emulsion bonding agent and polyacrylamido as its main components was screen printed to form bonding agent areas 8s, 20 μm thick, on the above-prepared printing lamination except the positions of ink 6 and ink 7, and then immediately laminated with a transparent polyester film, which was 16 μm thick, to form a covering layer 11.

The indicator label lamination to which the above-mentioned three kinds of printing and laminating processes have been applied is die-cut, trimmed and slit and then temporarily and peelably attached to the peeling paper to form a roll.

The above-mentioned three kinds of ink printing and transparent polyester film laminating processes are successively carried out using the continuous screen printer (made by Gallus Corporation) provided with three-head printing sections, laminator and other parts.

In a room whose temperature was kept 5° C., the indicator labels thus obtained were passed through the autolabeler (or automatic labeling machine) of the installation type provided with a hammer which was intended to break the microcapsules with impact, and they were bonded to foods whose temperature must be controlled. When they were bonded immediately after the microcapsules were broken, the color developing systems 7 developed dark green, informing that the temperature control function of the indicator labels was operating.

The foods to which the indicator labels had been bonded were stored in a refrigerator whose temperature was kept 0° C. The color developing systems 7 developed green till then but the ink composition positions 6 developed no color.

No change could be found even after the foods were stored at 0° C. for 72 hours.

When the foods were then moved to a room whose temperature was kept 13° C., the ink composition positions 6 began to develop light orange after three hours and became deep orange after nine hours.

The polyester film was laminated on the tops of the ink composition portions 6 without any bonding agent interposed between them, thereby preventing the color developer and dye-precursor from interacting with the bonding agent. When the foods were moved from the room of 0° C. to the other room of 13° C., dewing caused by water condensation was found on the surface of the indicator labels but the microcapsule printed positions A was not influenced by water because they were covered by the polyester film.

COMPARISON SAMPLE 1

When the bonding agent ink was printed even on the tops of the ink composition positions 6 in the case of the Example 1, the dye-precursor in the ink composition portions 6 interacted with the bonding agent and the amount of the dye-precursor which should act with the color developer was thus reduced, thereby causing the color development to be made insufficient in density and the temperature history indicator labels not to fulfill their function.

COMPARISON SAMPLE 2

When the indicator labels to which neither the printing of the bonding agent ink nor the laminating of the polyester film had been applied in the case of the Example 1 was used, a part of the microcapsules-containing layer peeled off because of dewing water or oil coming out of the foods, thereby making the color development uneven and the indicator labels unpractical.

EXAMPLE 2

A roll to which the indicator labels were temporarily attached was obtained using the dye-precursor in the Example 1 for the layer 4 and the color developer in the Example 1 for the ink composition portions 6 but leaving the others same as in the case of the Example 1. In a room whose temperature was kept 5° C., the indicator labels thus obtained were passed through the autolabeler (or automatic labeling machine) of the installation type provided with the hammer which was intended to break the microcapsules with impact, and they were then bonded to foods whose temperature must be controlled. When they were bonded to the food immediately after they were broken, the color developing system positions 7 speedily developed deep green, indicating that their temperature control function was operating.

The foods were stored in a refrigerator whose temperature was kept 0° C. The color developing systems 7 had developed green till then, but no color was found at the ink composition positions 6.

No change was found even after the foods were stored at 0° C. for 72 hours.

When the foods were then moved to a room whose temperature was kept 13° C., the ink composition portions 6 began to develop light orange after three hours and became deep orange after nine hours.

The polyester film was also laminated on the tops of the ink composition portions 6 without any bonding agent interposed between them, thereby preventing the color developer and dye-precursor from interacting with the bonding agent. When the foods were moved from the room of 0° C. to the other room of 13° C., dewing caused by water condensation was found on the surface of the indicator labels but the ink composition positions 6 covered by the polyester film was not influenced by water.

COMPARISON SAMPLE 3

The bonding agent ink was printed even on the tops of the ink composition positions 6 in the case of the Example 2. The color developer in the ink composition portions 6 interacted with the bonding agent and the amount of the color developer which should act with the dye-precursor was thus reduced, thereby making the color development insufficient in density and the indicator labels not to fulfill their temperature control function.

COMPARISON SAMPLE 4

Indicator labels to which neither the printing of the bonding agent ink nor the laminating of the polyester film had been applied in the case of Example 2 was used. A part of the microcapsules-containing layer peeled off because of dewing water or oil coming out of the foods, thereby making the color development uneven and the indicator labels unpractical.

EXAMPLE 3

An indicator label shown in FIGS. 4 and 5 was prepared according to the following method.

A synthetic paper 3 (YUPO SGG-80 made by OHJI PETEROCHEMICAL COMPANY LTD.), which used polypropylene as its base film, was used as the substrate 3. A color developer containing layer 4 was formed by coating an aqueous composition (35% dispersion), which had the following composition, through the Mayer bar coater and then drying it to have an amount of 6 g/m$^2$ when the coating was dried.

|  | solid weight part |
|---|---|
| calcinated kaoline | 70 |
| calcium carbonate | 30 |
| dispersant (polyacrylic acid Na salt) | 0.5 |
| starch binder (water solution) | 8 |
| synthetic rubber latex (dispersion) | 8 |
| color developer* (dispersion) | 5 |

*color developer: zinc salt of co-condensated resin of salicylic acid mesetylene-and-dimethoxy-p-xylene An acryl emulsion (solid content of 45% and prepared by the emulsion-polymerization method) comprising monomers of acrylonitrile (30 mol %)-butylacrylate(20 mol %)-stylene(48 mol %)acrylic acid(2 mol %) was diluted to 20% by water, coated, dried and filmed on the color developer containing layer 4 by means of the Mayer bar coater to have an amount of 2.8 g/m$^2$ when the coating was dried, thereby forming a barrier layer 5.

An acryl bonding agent of the solvent type was coated and dried on a silicon treated peeling paper 1 to have a thickness of 18 μm when the coating was dried. The bonding face of this peeling paper was bonded to (or laminated on) the underside of the above- prepared sheet to form a sheet of printing.

5% of 3-diethylamino-5,7-dimethylfluoran was dissolved in ethyl myristat as the dye-precursor and microencapsulated according to the in-situ polymerizing manner, using melamine resin prepolymer (URAMIN p-6300 made by Mitsui Toatsu Chemicals Inc.).

An aqueous ink (I) having the following composition was prepared using the microcapsule slurry thus obtained

|  | solid weight part |
|---|---|
| microcapsules of myristic acid ethyl in which the dye-precursor was dissolved | 100 |
| MSBR latex | 15 |
| alginic acid Na salt | 2 |
| polyacrylic acid Na salt | 2 |

The aqueous ink (I) was pattern-printed on the barrier 5 according to the screen printing manner to form ink composition positions 6A (the amount of the printed ink was 10 g/m$^2$ when it was dried).

The microcapsules in the water ink (I) were replaced by the following ones to provide a water based ink (II).

Microcapsule: myristic acid ethyl and myristic acid methyl were mixed at a rate of 7:3, 5 weight % of 3-diethylamino-7,8-benzo-fluoran was dissolved in the mixture and microencapsulated according to the in-situ polymerizing manner, using melamine resin prepolymer (URAMIN P-6300 made by Mitsui Toatsu Chemicals Inc.).

The aqueous ink (II) was pattern-printed on the barrier 5 where no ink composition position 6A is present according to the screen printing process to form ink composition positions 6B (the amount of the printed ink was 10 g/m$^2$ when it was dried).

A water screen printing ink having a fixed part of 40% was prepared using as its main components a microcapsule slurry made by coating diisopropylnaphthalene (KMC-113 made by Kureha Kagaku), in which 3 weight % of crystalviolet-lactone was dissolved, with a polymer, which was made by in-situ-radical-polymerizing acrylonitrile, acrylamido and methylenebisacrylamido for the cross linking agent, according to Example 1 in Japanese Patent preliminary Publication No. 61-40188; a water suspension of p-phenylphenolformaldehyde condensate (RBE-40 made by Mitsui Toatsu Chemicals Inc.) which served as the color developer; a water dispersion bonding agent; and a viscosity increasing agent. This water based screen printing ink was pattern-printed on the barrier 5 where neither the ink composition position 6A nor 6B is present to form color developing systems 7.

A screen ink of the UV setting type (SERIKOL EGX MEDIUM made by Teikoku Ink) was screen-printed, 10 μm thick, on the printing lamination where none of the ink composition positions 6A, 6B and color developing system 7 is present to form a bonding agent layer 8, a transparent polypropylene film having a thickness of 16 μm was at once laminated on the layer 9 and then passed through the UV radiator to form a covering layer 11.

The indicator labels to which the above-mentioned four kinds of printing and laminating processes had been applied were die-cut, trimmed and slit, and they were temporarily attached onto the peeling paper 1 to provide a roll of the indicator labels.

The above-mentioned three kinds of printing and transparent-polyester-film-laminating processes were successively carried out using the continuous screen printer provided with a four-head printing section, a laminator and their fixtures.

In a room whose temperature was kept 0° C., the indicator labels thus obtained were passed through the autolabeler (or automatic labeling machine) of the installation type provided with the hammer which was intended to break the microcapsules with impact, and they were then bonded to foods whose temperature must be controlled. The color developing systems 7 developed blue immediately after the microcapsules were broken, indicating that the temperature control function of the indicator labels was operating.

The foods were then stored in a refrigerator whose temperature was kept −2° C. The color developing systems 7 developed blue until then but no color could be found at the ink composition portions 6A and 6B. No change could be found even after the foods were stored at −2° C. for 72 hours.

When the foods were moved to a room whose temperature was kept 5° C., the ink composition portions 6B began to develop light purplish red after 30 minutes and became deep purplish red after 3 hours. The ink composition portions 6A showed no change in color.

When the foods were moved to a room whose temperature was kept 8° C., the ink composition portions 6A began to develop light orange after 30 minutes and became deep orange after 3 hours.

As described above, the indicator labels in Example 3 could indicate the history of storage temperature and tell the state of storage in more detail from the viewpoint of temperature.

COMPARISON SAMPLE 5

When those indicator labels to which the printing of UV setting resin and the laminating of polypropylene film had not been applied were used, a part of the partially-printed portions peeled off because of water dewing caused at the time of temperature rise, thereby making the color development uneven and the indicator labels impractical.

EXAMPLE 4

An indicator label shown in FIGS. 4 and 6 was prepared according to the following method.

A synthetic paper (UPO GPG-120 made by Ohji Peterochemical Company Ltd.) which used polypropylene as its base film was used as the substrate 3. A color developer containing layer 4 was prepared on the substrate 3 by coating an aqueous composition (35% dispersion), which had the following composition, through the Mayer bar coater and drying it to have an amount of 6 g/m² when the coating was dried.

|  | solid weight part |
| --- | --- |
| calcinated kaolin | 70 |
| calcium carbonate | 30 |
| dispersant (polyacrylic acid Na salt) | 0.5 |
| starch binder (water solution) | 8 |
| synthetic rubber latex (dispersion) | 8 |
| color developer* | 5 |

*color developer: zinc salt of 3,5-di-α-methylbenzylsalicylic acid

An acryl emulsion (45% of solid content and made by the emulsion-polymerization method) having those monomers of acrylonitrile(30 mol %)-butylacrylate(68 mol percent)-acrylic acid(2 mol %) was diluted to 20% by water, coated, dried and filmed on the color developer containing layer 4 through the Mayer bar coater to have an amount of 2.8 g/m² when the coating was dried, thereby forming a barrier 5A.

The acryl emulsion (45% of solid content) was diluted to 30% by water and stripe-coated on the barrier 5A through the gravure coater, using a carving roll, which had a width of 1 cm, at an interval of 1.5 cm, to have an amount of 2.0 g/m² when the coating was dried, thereby forming a barrier 5B.

An acryl bonding agent 2 was coated and dried on a silicon-treated peeling paper 1 to have a thickness of 18 μm when the coating was dried. The bonding face of the peeling paper 1 was laminated on the barrier 5B to form a printing lamination.

3 weight % of 3-diethylamino-6-chloro-7-methylfluoran was dissolved, as the dye-precursor, in myristic acid methyl and microencapsulated according to the in-situ polymerizing manner, using a melamine resin prepolymer (U-Ramin P-6300 made by Mitsui Toatsu Chemicals Inc.).

An aqueous ink having the following composition was prepared using the microcapsule slurry thus obtained.

|  | solid weight part |
| --- | --- |
| microcapsules of myristic acid methyl in which the dye-precursor was dissolved | 100 |
| MSBR latex | 15 |
| alginic acid Na salt | 2 |
| polyacrylic acid Na salt | 2 |

The aqueous ink was pattern-printed on the barriers 5A and 5B according to the screen printing manner to form ink composition positions 6B and 6A (the amount of printed ink was 10 g/m² and 12 g/m² when dried).

An aqueous screen printing ink (viscosity: 3000 cps) having a 40 percent solid and using as its main components a melamin resin wall microcapsule slurry made by in-situ polymerizing phenylxylylethane in which 3 weight % of zinc salt of 3,5-4-methylbenzylsalcylic acid was dissolved, and an aqueous suspension of 3-diethylamino-7-(o-chloroanilino)fluoran was prepared and pattern-printed on the barriers-containing layer where none of the ink composition positions 6A and 6B was present. Color developing systems 7 were thus formed.

A previously-prepared screen printing bonding agent ink composition (45% solid and 1500 cps) which used as its main components an acryl emulsion bonding agent and a polyacrylamido viscosity increasing agent was screen-printed, 20 μm thick to form bonding agent areas 8s, on the layer 9 but except those areas where the ink composition positions 6A, 6B and color developing system 7 were present, and heat-dried to remove water. And then a transparent polyester film having a thickness of 16 μm was laminated thereon to form a protection layer.

Indicator labels to which the above-mentioned three kinds of printing and laminating processes (at four portions) had been applied were die-cut, trimmed and slit according to the well-known manner and they were temporarily and peelably attached to a peeling paper 1 to form a roll of the indicator labels.

The above-mentioned three kinds of ink-printing and transparent-polyester-film-laminating processes were successively carried out using the screen printer provided with a three-head printing section, laminator and their fixtures.

In a room whose temperature was kept 5° C., the two indicator labels thus obtained were passed through the hammer machine which was intended to break the microcapsules with impact, to break the microcapsules in the ink composition positions 6A, 6B and color developing systems 7, and they were then stored in thermostatic boxes, respectively, to observe the color developments at their pattern-printed portions. The temperatures in these boxes were set 13° C. and 5° C.

In the case of the indicator label stored at 13° C., its color developing system 7 developed deep green at once and its ink composition position 6B gradually developed red after 2 hours and became red completely after about 6 hours The ink composition portion 6A started its color development after 5 hours and developed red completely for about 10 hours.

In the case of the indicator label stored at 5° C., the color developing system 7 developed deep green at once but no color development could be found at the ink composition positions 6A and 6B even after 48 hours.

EXAMPLE 5

An indicator label shown in FIGS. 4 and 7 was prepared according to the following method.

A color developer containing layer 4 was formed on the synthetic paper 3, which was used in Example 4, according to the same manner as in Example 4, but the color developer in Example 4 was replaced by the following one:

color developer: 2,5-dicyclohexylcarbonyl-3-benzyl-sulfonile-1,4-benzoquinone

An acrylic emulsion (solid content 45% and made by the emulsion-polymerization process) having a monomer composition of acrylonitrile(30 mol %)-butylacrylate(68 mol %)-acrylic acid (2 mol %) was diluted by water to 30% and stripe-coated on the color developer containing layer 4 through the gravure coater, using a carving roll, which was 1 cm wide, at an interval of 1.5 cm, to have an amount of $2.5 g/m^2$ when the coating was dried, thereby forming a barrier layer 5A.

An acrylic emulsion (solid content 45% and made by the emulsion-polymerization process) having a monomer composition of acrylo- nitrile(40 mol %)-butylacrylate(58 mol %)-acrylic acid(2 mol %) was diluted by water to 30% and stripe-coated, similarly to the above, 1 cm wide and parallel to the barrier 5A, thereby forming a barrier 5B arranged with the barrier 5A side by side.

The bonding face of the peeling paper used in Example 4 was bonded to (or laminated on) the underside of the above-prepared product to form a printing lamination.

An aqueous ink was prepared similarly to the case of Example 4 but the dye-precursor was replaced by the following one:

dye-precursor: 3-diethylamino-6-chloro-7-methyl-9-(2'-methylphenylcarboxyamido)-phenylxanthene According to the screen printing manner, the aqueous ink was pattern-printed on the barrier 5A to form an ink composition position 6A and on the barrier 5B to form an ink composition position 6B, respectively (the amount of the printed ink was $10 g/m^2$ when dried).

An aqueous screen printing ink (viscosity: 3000 cps) having a solid content of 40% and using as its main components a melamine resin film microcapsule slurry made of in-situ polymerizing phenylxylylethane in which 3 weight % of 2,5-dicyclohexylcarbonyl-3-benzylsulfonyl-1,4-benzoquinone (color developer), a polyacrylic acid viscosity increasing agent, and a binder agent was prepared and screen-printed on the printing sheet but except those areas where the barriers were present, thereby forming a color developing system 7.

A previously-prepared screen printing bonding agent ink composition (solid content 45% and 1500 cps) which used as its main components an acryl emulsion bonding agent and a polyacrylamido viscosity increasing agent was screen-printed, 20 μm thick, on the layer 4 but except those area thereon where the ink composition portions 6A, 6B and color developing system 7 were present to form a bonding layer 8, and heat-dried to remove water. A transparent polyester film was laminated at once, 16 μm thick, on the bonding agent layer 8 to form a covering layer 11.

Those indicator labels to which the above-mentioned three kinds of printing and laminating processes (at four portions) had been applied were die-cut, trimmed and slit according to the well-known manner and they were temporarily and peelably attached to a peeling paper 1 to form a roll of the indicator labels.

In a room whose temperature was kept 5° C., the two indicator labels thus obtained was passed through the hammer machine, which was intended to break the microcapsules with impact, to break the microcapsules in the ink composition portions 6A, 6B and color developing systems on the indicator labels and one of them was stored in a thermostatic box whose temperature was kept 12° C. while the other in another thermostatic box whose temperature was kept 0° C. to observe the color development at their pattern-printed portions.

In the case of the indicator label stored at 12° C., the color developing system 7 developed green at once and the ink composition portion 6A started its color development after 1.5 hours and became red completely after about 5 hours. The ink composition portion 6B started its color development after 6 hours and became red completely after about 12 hours.

In the case of the indicator label stored at 0° C., the color developing system 7 developed green at once, but no color development could be found at the ink composition portions 6A and 6B even after 48 hours.

COMPARISON SAMPLE 6

Those indicator labels to which the bonding agent ink printing and polyester laminating processes had not been applied in Example 5 were bonded to a plurality of packs in which fresh fishes were contained and these packs were stored piling one upon the other in a showcase (in which the temperature was kept 5° C.) at a supermarket. However, the ink composition portions 6A and 6B contacted with fish oil leaking out of the packs became uneven in color not to fulfill their temperature control function.

We claim:

1. A temperature history indicator comprising layers A and B formed on a substrate, said layer A containing either a color developer or a dye-precursor and said layer B containing at least one ink composition which includes either the color developer or the dye-precursor not contained in said layer A and microcapsules enclosing a hydrophobic organic compound which has a predetermined melting point, or said layer B containing at least one ink composition which includes microcapsules enclosing a hydrophobic organic compound in which either the color developer or the dye-precursor not contained in the layer A is dissolved or dispersed and which has a predetermined melting point, characterized in that the ink composition is placed on a limited area in said layer B, and the top of said layer B is covered by a transparent covering layer using a bonding agent, which is placed on a limited area in said layer B to prevent contact with the ink composition.

2. A temperature history indicator according to claim 1 wherein said bonding agent layer is arranged on the whole of the layer B except the area where the at least one ink composition is present.

3. A temperature history indicator according to claim 2 wherein a barrier is formed between the layers A and B.

4. A temperature history indicator according to claim 1 wherein a barrier is formed between the layers A and B.

5. A temperature history indicator according to claim 4 wherein a barrier consists of two or more barrier layers, and the upper barrier layer or layers are formed on a part of the lower barrier layer or layers.

6. A temperature history indicator according to claim 5 wherein the upper barrier layer which is formed on a part of the lower barrier layer consists of two or more kinds of barrier layers.

7. A temperature history indicator according to claim 4 wherein a barrier consists of two or more kinds of barrier layers, each of them being formed on a same plane, and the at least one ink composition is formed on each of them.

8. A temperature history indicator according to any of claims 1, 2, 4, 3, 5, 6 and 7 further comprising a second ink composition for checking system, wherein said second ink composition is placed in said layer A or said layer B along with the at least one ink composition to enable people to easily see that the indicator is normally operating, said second ink composition comprising:
   (a) microcapsules enclosing a hydrophobic organic compound in which either a color developer or a dye precursor is dissolved;
   (b) either the dye precursor or the color developer not selected in (a); and
   (c) binder(s) and additives and the indicator thereby undergoes color development of the second ink composition almost instantly by mechanical activation regardless of the temperature.

9. A temperature history indicator according to claim 1 wherein a checking system is placed in said layer A or said layer B to indicate the working of the indicator, and said checking system is formed by an ink composition which includes (a) microcapsules enclosing a hydrophobic organic compound in which either a color developer or a dye-precursor is dissolved, and (b) either the color developer or the dye-precursor not selected in (a).

10. A method of manufacturing a temperature history indicator comprising (a) forming a layer A, which contains either a color developer or a dye-precursor, on the whole of a substrate, (b) forming a layer B including an ink composition which is placed on limited area of the layer A, said ink composition includes either the color developer or the dye-precursor not selected in layer A and a hydrophobic organic compound having a predetermined melting point and enclosed in microcapsules, or said ink composition includes a hydrophobic organic compound which has a predetermined melting point and in which either the color developer or the dye-precursor not selected in layer A is dissolved or dispersed and the dissolved or dispersed matter is enclosed by microcapsules, to thereby form an ink composition layer, (c) printing or coating a bonding agent layer so that the bonding agent does not contact the ink composition, and (d) arranging a covering layer on the layer in which the ink composition and bonding agent layers are contained.

11. A temperature history indicator manufacturing method according to claim 10 wherein (a) one of the color developer and the dye-precursor is coated on the whole of the substrate, (b) a barrier which consists of one or more kinds of barrier layers is further formed thereon, and (c) the ink composition is partially printed or coated on the top of the barrier.

12. A temperature history indicator manufacturing method according to claim 11 wherein an upper barrier layer is coated or printed on a part of a lower barrier layer and the ink composition is partially printed or coated on each of the upper and lower barriers.

13. A temperature history indicator manufactured method according to claim 12 wherein a second ink composition for a checking system containing
   (a) microcapsules enclosing a hydrophobic organic compound in which either a color developer or a dye-precursor is dissolved,
   (b) either the dye-precursor or the color developer not selected in (a), and
   (c) binder(s) and additives is printed or coated in said layer A or said layer B along with the ink composition(s) and thereby undergoes color development of the second ink composition almost instantly regardless of the temperature by rupturing microcapsules by mechanical means before the indicator is to be used.

14. A temperature history indicator manufacturing method according to claim 11 wherein two or more kinds of barrier layers are coated or printed side by side on a same plane and the ink composition is partially printed or coated on these barrier layers.

15. A temperature history indicator manufacturing method according to claim 14 wherein a second ink composition for a checking system containing
   (a) microcapsules enclosing a hydrophobic organic compound in which either a color developer or a dye-precursor is dissolved,
   (b) either the dye-precursor or the color developer not selected in (a), and
   (c) binder(s) and additives is printed or coated in said layer A or said layer B along with the ink composition(s) and thereby undergoes color development of the second ink composition almost instantly regardless of the temperature by rupturing microcapsules by mechanical means before the indicator is to be used.

16. A temperature history indicator manufacturing method according to claim 11 wherein a second ink composition for a checking system containing
   (a) microcapsules enclosing a hydrophobic organic compound in which either a color developer or a dye-precursor is dissolved,
   (b) either the dye-precursor or the color developer not selected in (a), and
   (c) binder(s) and additives
is printed or coated in said layer A or said layer B along with the ink composition(s) and thereby undergoes color development of the second ink composition almost instantly regardless of the temperature by rupturing microcapsules by mechanical means before the indicator is to be used.

17. A temperature history indicator manufacturing method according to claim 10, wherein a second ink composition for a checking system containing
   (a) microcapsules enclosing a hydrophobic organic compound in which either a color developer or a dye-precursor is dissolved,
   (b) either the dye-precursor or the color developer not selected in (a), and
   (c) binder(s), and additives is printed or coated in said layer A and said layer B along with the ink composition(s) and thereby undergoes color development of the second ink composition almost instantly regardless of the temperature by rupturing microcapsules by mechanical means before the indicator is to be used.

* * * * *